United States Patent [19]

Knutson

[11] 4,342,202

[45] Aug. 3, 1982

[54] BEVERAGE COOLING APPARATUS FOR CONNECTION TO AUTO AIR CONDITIONER

[76] Inventor: Russell R. Knutson, 200 NE. 28 Ter., Boca Raton, Fla. 33432

[21] Appl. No.: 247,236

[22] Filed: Mar. 25, 1981

[51] Int. Cl.³ .............................................. B60H 3/04
[52] U.S. Cl. ...................................... 62/243; 62/299; 62/244; 62/394; 222/146 C
[58] Field of Search ................ 62/243, 244, 394, 299, 62/7, 457, 315, 316; 296/37.1; 222/146 C

[56] References Cited

U.S. PATENT DOCUMENTS

| | | | |
|---|---|---|---|
| 2,160,639 | 5/1939 | Billings | 62/394 |
| 2,781,648 | 2/1957 | Lyman | 62/394 |
| 3,498,076 | 3/1970 | Michael | 62/244 |
| 3,558,013 | 1/1971 | Ponzo | 222/146 C |
| 3,605,421 | 9/1971 | Patrick | 62/394 |
| 3,719,058 | 3/1973 | Waygood | 62/243 |
| 3,850,006 | 11/1974 | Redfern et al. | 62/243 X |
| 3,858,405 | 1/1975 | Manzke | 62/243 X |
| 3,912,475 | 10/1975 | Patrick | 62/244 |
| 4,034,571 | 7/1977 | Bollinger | 62/244 |
| 4,071,078 | 1/1978 | Padden | 62/394 X |
| 4,103,510 | 8/1978 | Hall | 62/299 |
| 4,140,150 | 2/1979 | Rundell | 222/146 C |

Primary Examiner—Lloyd L. King
Attorney, Agent, or Firm—Oltman and Flynn

[57] ABSTRACT

The present beverage cooling apparatus has an insulated container with an inclined bottom wall shaped to fit on top of a wheel well in the engine compartment of a car. A series of coiled pipes inside the container can be connected to the car's air conditioner to pass refrigerant through the interior of the container to cool the drinking water or other beverage. A thermostatic expansion valve cools the refrigerant just before it enters the container. This valve is regulated by a temperature sensor which senses the temperature of the refrigerant as it leaves the container. The container has a capped drain opening at the bottom at its deeper end, a capped fill opening at the top, and a freeze plug on one side which detaches itself from the container if the beverage freezes. A motor-pump unit on top of the container has a beverage intake pipe extending down near the bottom of the container at its deeper end, and a filter is provided on this end of the intake pipe. The pump discharges the beverage to a dashboard-mounted dispensing valve through a T-fitting, a conduit with a U-bend, and a charcoal filter. The T-fitting has a small passage extending down into the container at the top. The U-bend in the conduit has a small bottom opening at its low point.

9 Claims, 3 Drawing Figures

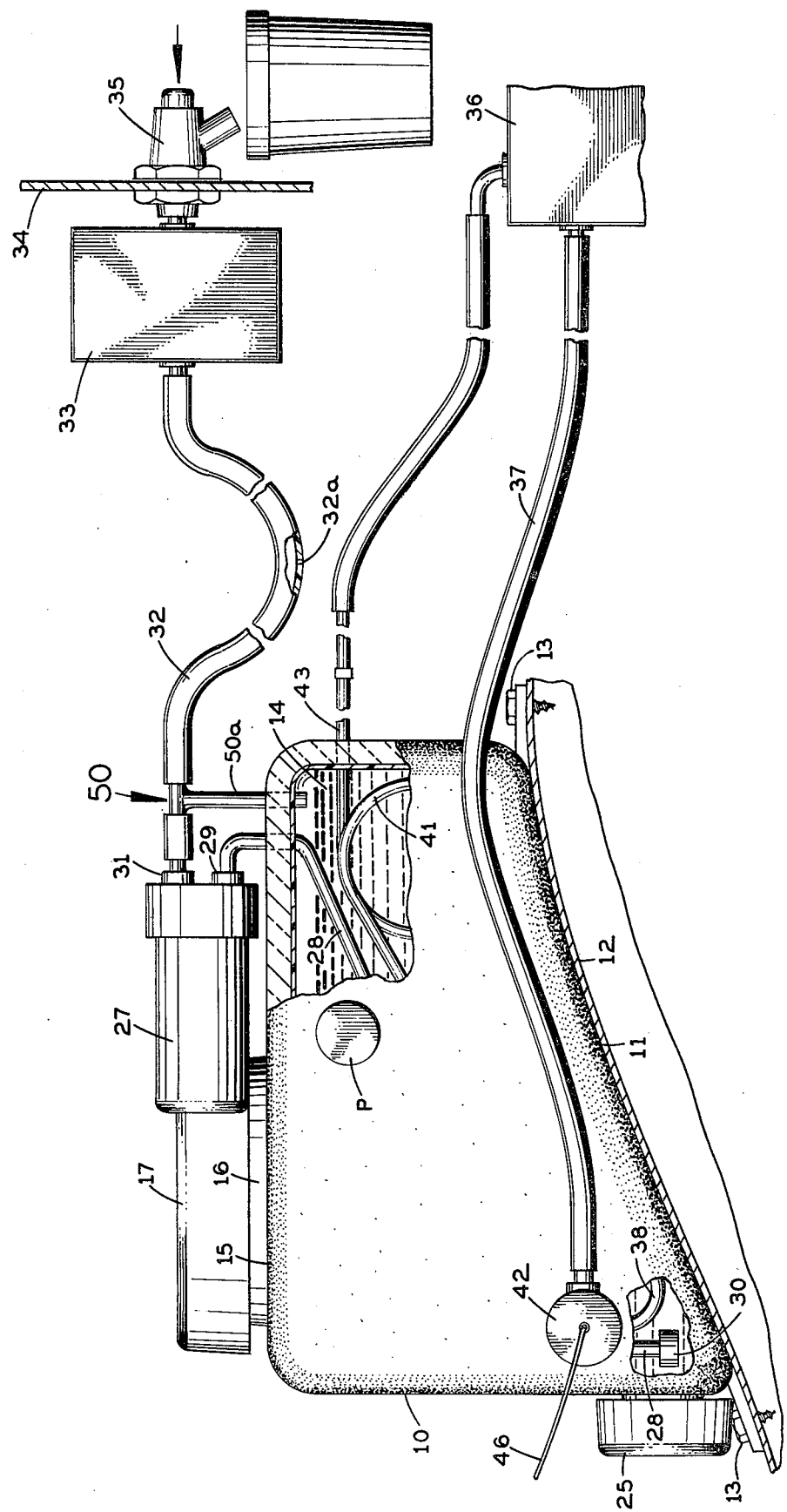

BEVERAGE COOLING APPARATUS FOR CONNECTION TO AUTO AIR CONDITIONER

SUMMARY OF THE INVENTION

This invention relates to an apparatus for cooling drinking water or another beverage using refrigerant from the air conditioner on an automotive vehicle as the coolant.

In its presently preferred embodiment, this apparatus includes an insulated container with an inclined bottom which is curved to fit on top of the wheel well on one side of the engine compartment of the vehicle. A fill opening is provided in the top of the container and a drain opening is provided at its deeper end. The container receives a cooling pipe arranged in several helical rows for conducting refrigerant from the deeper end to the shallower end of the container. An expansion valve at the inlet end of this cooling pipe is controlled by a thermal sensor on its outlet end. The cooling pipe is connected to the vehicle's air conditioner to receive refrigerant from it. A motor-pump unit on top of the container draws cooled, filtered beverage from the bottom of the container at its deeper end and delivers it through a charcoal filter to a dispensing valve mounted on the dashboard of the vehicle. A conduit with a U-bend is connected between the pump outlet and the charcoal filter. This conduit has a very small bottom opening at its low point. A T-fitting ahead of this conduit defines a small vertical passage extending down into the container at the top. The container carries a freeze plug which detaches itself from the container if the beverage inside freezes or approaches a freezing temperature.

A principal object of this invention is to provide a novel beverage cooling apparatus for use on an automotive vehicle with the latter's air conditioner providing refrigerant to the cooling apparatus.

Another object of this invention is to provide such a cooling apparatus which is adapted to be mounted in the vehicle's engine compartment conveniently close to the air conditioner and close to a dispensing valve in the passenger compartment of the vehicle.

Another object of this invention is to provide such a cooling apparatus having an insulated container which has a convenient arrangement for filling it with the beverage to be cooled and a convenient arrangement for draining the beverage from it, when desired.

Another object of this invention is to provide a novel apparatus for supplying a cool beverage to a dispensing valve in the passenger compartment of an automotive vehicle, which apparatus includes a novel arrangement for promptly stopping the flow of beverage to the dispensing valve upon closing of the valve.

Further objects and advantages of this invention will be apparent from the following detailed description of a presently preferred embodiment shown in the accompanying drawings.

DESCRIPTION OF THE DRAWINGS

FIG. 3 is a side elevational view of the apparatus, with certain parts broken away for clarity.

DETAILED DESCRIPTION

Figure 1:
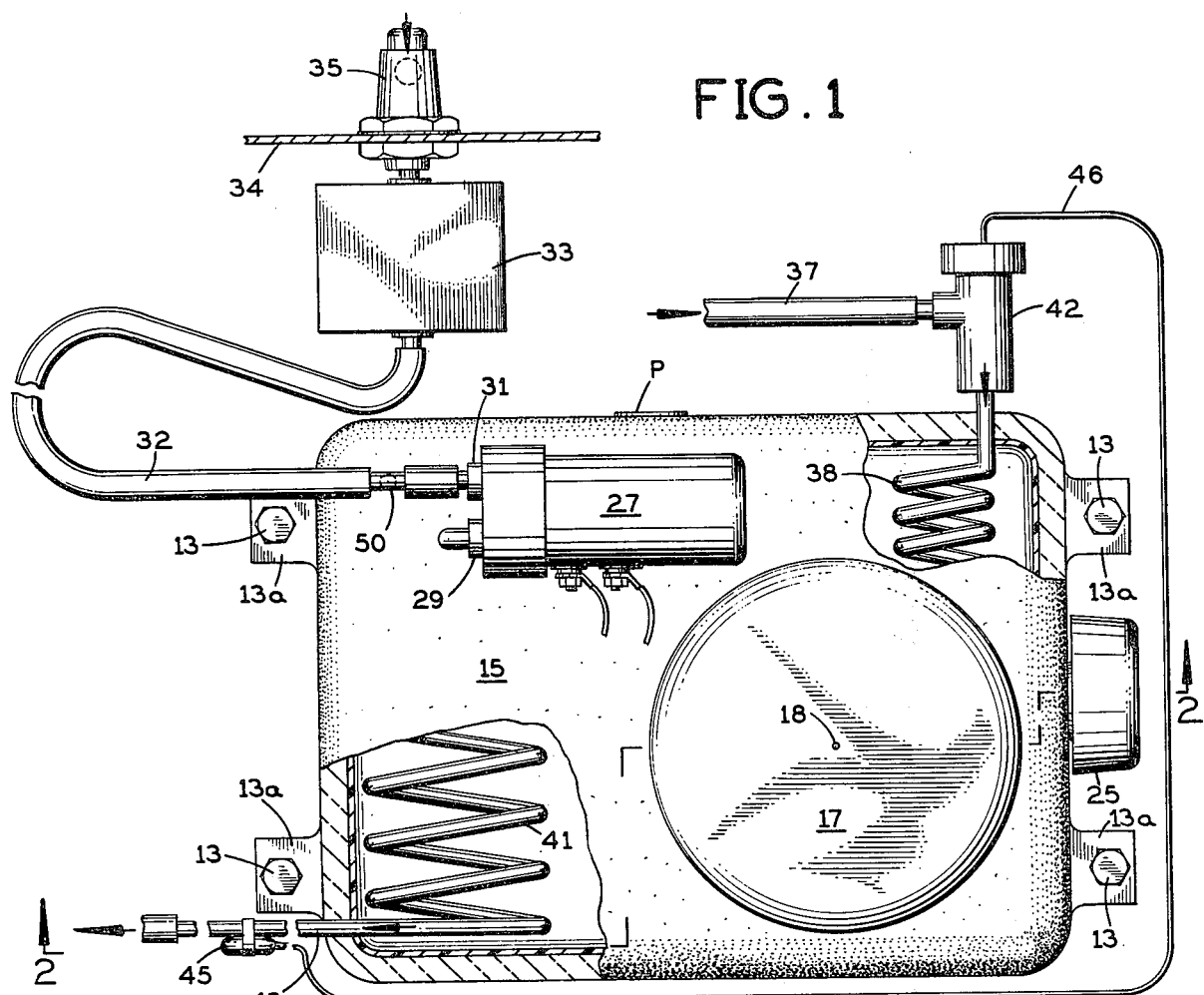
FIG. 1 is a schematic top plan view of the present beverage cooling apparatus with certain parts broken away for clarity.

Referring first to FIG. 3, the present beverage cooling apparatus comprises an insulated container 10 having an inclined bottom wall 11 which conforms to the curvature of a wheel well 12 at the inside of the engine compartment on the passenger side of the automobile. The container rests on the wheel well and is rigidly attached to it by four sheet metal screws 13, each of which engages a mounting tab 13a projecting out from the container near one corner, as shown in FIG. 1. Viewed from above, the insulated container is generally rectangular in outline, with rounded corners.

The container holds a suitable volume (such as one gallon) of drinking water 14 or other beverage. At its generally horizontal top wall 15 the container is formed with an upwardly projecting, annular, externally screw-threaded neck 16 (FIG. 2) which defines a large diameter opening through which the beverage to be cooled can be poured down into the container. This fill opening is closed by a removable cap 17 which is internally screw-threaded and threadedly engages the container neck 16. This filler cap is formed with a small diameter vent opening 18. A filter screen 19 extends across the fill opening. The periphery of this screen is attached to a tapered annular ring 20 having an outwardly projecting, horizontal, annular flange 21 at its upper end which is sandwiched between the top of the container neck 16 and the bottom face of the filler cap 17.

The fill opening is large enough to permit ice cubes to be dropped down through it into the container after first removing the filter screen 19. At its deeper end, the end wall 22 of the container (FIG. 2) presents an outwardly projecting, annular, externally screw-threaded neck 23, the bottom of which blends smoothly with the inclined bottom inside face 24 of the container. This neck defines a drain opening for emptying the beverage from the container, when desired. An internally screw-threaded cap 25, which carries a sealing liner 26 on the inside, normally closes this drain opening in a liquid-tight manner.

A freeze plug P (FIG. 1) is mounted in one side wall of the container 10. This plug will detach itself from the container in response to the increased pressure exerted on it by the beverage if the beverage freezes or closely approaches freezing temperature. Unless this happens, the plug P will remain in place in the container side wall. The purpose of this plug is to prevent the container 10 from bursting if the beverage inside freezes or reaches a temperature close to freezing.

Figure 2:
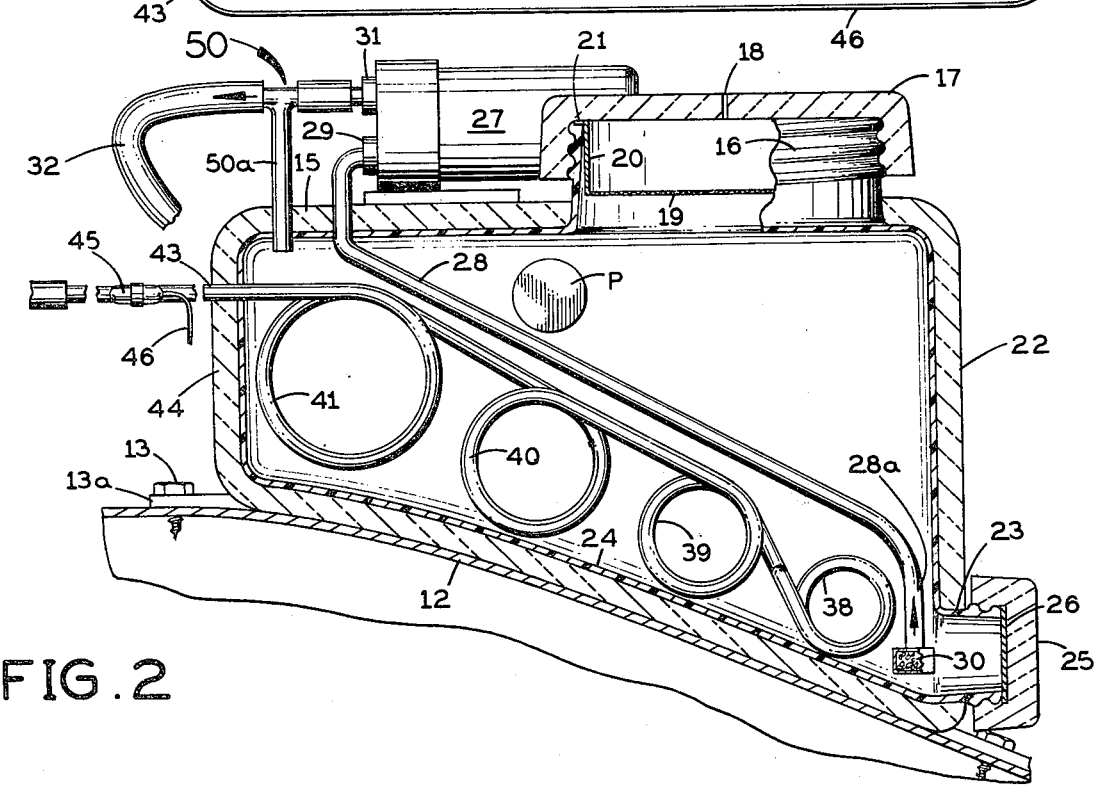
FIG. 2 is a vertical cross-section taken along the line 2—2 in FIG. 1.

An electric motor and pump unit 27 is mounted on top of the container (FIG. 2). A beverage intake pipe 28 extends down from the pump inlet 29 through the top wall 15 of the container and then diagonally downward into the deeper end of the container. At its lower end the beverage intake pupe terminates in a short vertical segment 28a which carries a filter 30 located just inside the drain opening formed by the container neck 23 and very close to the inside bottom surface 24 of the container. The pump has its outlet 31 connected to a conduit 32 which leads to a charcoal filter 33 (FIG. 1) mounted in front of the dashboard 34 of the car. A push button-operated dispensing valve 35, mounted behind the dashboard in the passenger compartment of the car, is connected to receive the filtered beverage from the filter 33. Preferably, this valve includes a switch (not shown) which is connected to the motor in the motor-pump unit 27 to start the pump each time the push button on the valve is depressed to open the valve and to stop the pump when the valve push button is released.

The conduit 32 has a U-shaped bend (FIG. 3) whose low point is substantially below the pump outlet 31. At this low point the conduit is formed with a very small opening 32a in the bottom, the size of which is exaggerated in FIG. 3 for clarity. A T-fitting 50 is connected between the pump outlet 31 and the adjacent end of conduit 32. A vertical leg 50a of this T-fitting extends down through the top wall 15 of the container and terminates inside the container a very short distance below its top wall. This vertical leg 50a defines a small diameter passageway.

With this arrangement, whenever the dispensing valve 35 is opened, the pump withdraws water or other beverage from the bottom of the container 10 through the intake filter 30 and intake pipe 28 and discharges the liquid through the conduit 32 and charcoal filter 33 to the dispensing valve 35. An inconsequentially small amount of the beverage being pumped may go back down into the container through the passageway in the vertical leg 50a of the T-fitting 50. An even smaller amount may leak out the opening 32a at the low point of conduit 32.

Whenever the dispensing valve 35 is closed, the beverage pump will shut off but the inertia of its moving parts and the inertia of the moving liquid usually will tend to cause a momentary surge of the liquid pressure between the pump outlet 31 and the now-closed dispensing valve. This beverage now trapped between the pump outlet 31 and the adjacent end of conduit 32 empties down into the container 10 through the passageway in the vertical leg 50a of the T-fitting 50. Then air enters this passageway and goes up into the upper leg of the T-fitting, creating an air bubble between the pump outlet 31 and the adjacent end of conduit 32. Beverage trapped in the U-bend in the conduit 32 can leak out slowly through the small opening 32a at its low point, after which air at atmospheric pressure fills the entire conduit 32.

In accordance with the present invention, the beverage 14 in the container is cooled by refrigerant from the car's air conditioner, indicated generally at 36 in FIG. 3. A refrigerant supply hose 37 extends from the outlet side of the condenser in the air conditioner to a series of rows of pipe coils inside the container 10.

Only a small fraction of the refrigerant is diverted from the air conditioner to the present beverage cooling apparatus, which is connected in parallel with the evaporator in the air conditioner. Most of the refrigerant flows through the evaporator, and the amount of refrigerant diverted to the present beverage cooler is not enough to seriously affect the air conditioner's performance while the present beverage cooler is operating.

As shown in FIG. 2, the pipe coils form four helical rows 38, 39, 40 and 41 in which the coils are progressively larger in diameter proceeding from the deeper end of the tank to its shallower end. A thermostatic expansion valve 42 of known design (FIG. 3) is connected between the refrigerant supply hose 37 and the first helical pipe row 38 (FIG. 2) inside the container. The relatively warm refrigerant entering the expansion valve 42 becomes cooled by its expansion in valve 42 and enters the helical pipe row 38 at a greatly reduced temperature. The refrigerant passes in succession through the coiled pipe rows 38, 39, 40 and 41 and leaves the container through a pipe 43 passing horizontally from the row 41 of largest diameter pipe coils through the shallow end wall 44 of the container. A thermal sensor bulb 45 is clamped to the pipe 43 just outside the container to sense the temperature of the refrigerant there. This thermal sensor is operatively connected through a line 46 to the thermal expansion valve 42 to regulate the valve's operation in a known manner. A return hose 47 extends from the outlet pipe 43 back to the inlet side of the compressor in vehicle air conditioner 36.

In the operation of this part of the apparatus, the refrigerant flowing through the rows of coiled pipe 38, 39, 40 and 41 in the container 10 absorbs heat from the beverage 14 in the container, preferably cooling it to a temperature of about 40° F. to 48° F. within 15 minutes after the air conditioner 36 is turned on or in a shorter time, depending upon the ambient air temperature. Satisfactory results have been obtained at air temperatures as high as about 100° F.

From the foregoing, it will be apparent that the present cooling apparatus may be conveniently installed on an existing car and connected to the car's air conditioner so that the latter's refrigerant will cool a beverage, such as drinking water, in the insulated container.

I claim:

1. A beverage cooling apparatus for use on an automotive vehicle having an air conditioner, said apparatus comprising:

an insulated container for holding the beverage having substantially parallel opposite end walls;

a continuous pipe assembly having a plurality of rows of several interconnected pipe coils, each row of pipe coils extending helically about an axis which extends substantially parallel to said end walls, and said rows of pipe coils being positioned in succession along the inside of the container from one end row located adjacent one of said end walls of the container to an opposite end row located adjacent the opposite end wall;

means for introducing refrigerant from the air conditioner into said one end row of pipe coils in the container to flow through the successive rows of pipe coils for cooling the beverage in the container;

means for passing the refrigerant from the opposite end row of pipe coils in the container back to the air conditioner;

a motor-pump unit mounted on top of the container;

and a beverage intake pipe connected at its upper end to the inlet of the pump in said motor-pump unit, said intake pipe extending down into the container and terminating in an open lower end in close proximity to the bottom of the container for passing the beverage from the container up to the pump.

2. An apparatus according to claim 1, wherein:

said container has an inclined bottom wall with a curvature conforming to the top of a wheel well in the engine compartment of the vehicle, said bottom wall extending from a shallower end to a deeper end of the container;

and the end wall of the container at its deeper end is formed with an outwardly projecting, annular, screw-threaded neck which defines a drain opening at the inside bottom surface of the container;

and further comprising:

a screw-threaded cap detachably mounted threadedly on said neck and covering said drain opening.

3. An apparatus according to claim 1, and further comprising:

a beverage dispensing valve;

means providing a beverage passageway connecting the outlet of the pump to said dispensing valve;

means providing a small diameter branch passage extending from said beverage passageway adjacent the outlet of the pump down into said container at the top;

said means providing the beverage passageway including a conduit with a U-shaped bend located between said branch passage and said dispensing valve, said U-shaped bend having its low point substantially below the outlet of the pump, said conduit having a small opening in the bottom at said low point.

4. A beverage cooling apparatus for use on an automotive vehicle having an air conditioner, said apparatus comprising:

an insulated container for holding the beverage;

a coiled pipe assembly inside said container providing a continuous passageway for refrigerant;

means for introducing refrigerant from the air conditioner into the container at one end of said passageway;

means for passing the refrigerant from the container at the opposite end of said container back to the air conditioner;

a motor-pump unit mounted on top of the container;

a beverage intake pipe connected at its upper end to the inlet of the pump in said motor-pump unit, said intake pipe extending down into the container and terminating in an open lower end in close proximity to the bottom of the container for passing the beverage from the container up to the pump;

a beverage dispensing valve;

means providing a beverage passageway connecting the outlet of the pump to said dispensing valve to pass beverage pumped from the container to said dispensing valve;

and means providing a small diameter branch passage extending from said beverage passageway adjacent the outlet of the pump down into said container at the top;

said means providing the beverage passageway including a conduit with a U-shaped bend having its low point substantially below the outlet of the pump, said conduit having a small opening in the bottom at its low point.

5. An apparatus according to claim 4, wherein said U-shaped bend is located between said branch passage and said dispensing valve.

6. An apparatus according to claim 5, wherein:

said container has an inclined bottom wall with a curvature conforming to the top of a wheel well in the engine compartment of the vehicle, said bottom wall extending from a shallower end of the container to a deeper end of the container;

and said lower end of the beverage intake pipe is close to the bottom of the container at said deeper end.

7. A beverage cooling apparatus for use on an automotive vehicle having an air conditioner, said apparatus comprising:

an insulated container for holding the beverage having opposite end walls;

a continuous pipe assembly having a plurality of rows of several interconnected pipe coils positioned in succession along the inside of the container from one end row located adjacent one of said end walls of the container to an opposite end row located adjacent the opposite end wall;

means for introducing refrigerant from the air conditioner into said one end row of pipe coils in the container to flow through the successive rows of pipe coils for cooling the beverage in the container;

means for passing the refrigerant from the opposite end row of pipe coils in the container back to the air conditioner;

said container having an inclined bottom wall with a curvature conforming to the top of a wheel well in the engine compartment of the vehicle, said bottom wall extending from a shallower end to a deeper end of the container;

the end wall of the container at its deeper end being formed with an outwardly projecting, annular, screw-threaded neck which defines a drain opening at the inside bottom surface of the container;

a screw-threaded cap detachably mounted threadedly on said neck and covering said drain opening;

said container having a top wall with an upwardly projecting, annular, screw-threaded neck which defines a fill opening;

a screw-threaded cap detachably mounted threadedly on said upwardly projecting neck and covering said fill opening, said cap having a small vent opening therein;

and a freeze plug mounted at an opening in a wall of the container and operative to detach itself from said wall in response to pressure caused by freezing of the beverage in the container.

8. A beverage cooling apparatus for use on an automotive vehicle having an air conditioner, said apparatus comprising:

an insulated container for holding the beverage;

a coiled pipe assembly inside said container providing a continuous passageway for refrigerant;

means for introducing refrigerant from the air conditioner into the container at one end of said passageway;

means for passing the refrigerant from the container at the opposite end of said container back to the air conditioner;

a motor-pump unit mounted on top of the container;

a beverage intake pipe connected at its upper end to the inlet of the pump in said motor-pump unit, said intake pipe extending down into the container and terminating in an open lower end in close proximity to the bottom of the container for passing the beverage from the container up to the pump;

a filter on the lower end of said beverage intake pipe;

said container having an inclined bottom wall extending from a shallower end of the container to a deeper end of the container;

said lower end of the beverage intake pipe being close to the bottom of the container at the deeper end;

said coiled pipe assembly in the container having a plurality of rows of interconnected pipe coils positioned in succession along the inside of the container from said deeper end to the said shallower end thereof;

said container at its deeper end having an end wall with an outwardly projecting, annular, screw-threaded neck which defines a drain opening at the inside bottom surface of the container;

and said container having a top wall with an upwardly projecting, annular, screw-threaded neck which defines a fill opening;

a screw-threaded cap detachably mounted threadedly on said neck on said end wall and covering said drain opening;

a screw-threaded cap detachably mounted threadedly on said neck on said top wall and covering said fill opening, said last-mentioned cap having a small vent opening therein;

and a freeze plug mounted at an opening in a wall of the container and operative to detach itself from said wall in response to pressure caused by freezing of the beverage in the container.

9. An apparatus according to claim 8, and further comprising:

an expansion valve operatively connected just ahead of said one end of the refrigerant passageway in the container to cool the refrigerant entering said passageway;

a thermal sensor operatively arranged to sense the temperature of the refrigerant leaving the container, said sensor being operatively connected to said expansion valve to regulate the latter in accordance with the temperature of the refrigerant leaving the container;

a beverage dispensing valve operatively connected to the outlet of the pump to receive therefrom the beverage pumped from the container;

and a filter connected between the outlet of the pump and said dispensing valve.

* * * * *